United States Patent [19]

Menard

[11] Patent Number: 4,476,205
[45] Date of Patent: Oct. 9, 1984

[54] PRESSED CADMIUM ELECTRODE AND METHOD OF MAKING THE SAME

[76] Inventor: Claude J. Menard, 6384 Aspenwood Plaza, Woodbury, Minn. 55125

[21] Appl. No.: 483,764

[22] Filed: Apr. 11, 1983

[51] Int. Cl.³ .............................................. H01M 4/24
[52] U.S. Cl. .................................... 429/217; 429/222; 429/242; 29/623.5
[58] Field of Search ................ 429/217, 222, 212, 60, 429/242; 252/182.1; 29/623.5

[56] References Cited

U.S. PATENT DOCUMENTS 3,877,986  4/1975  Catherino ...................... 429/222 X
3,888,695  6/1975  Catherino ...................... 429/222 X Primary Examiner—Anthony Skapars
Attorney, Agent, or Firm—Wallenstein, Wagner, Hattis, Strampel & Aubel

[57] ABSTRACT

A cadmium electrode for a rechargeable alkaline cell comprises a rigid substrate having particle-receiving recesses therein into and upon which are pressed a particulate mix of binder coated cadmium oxide particles and cadmium particles which constitute an active pre-charge anti-fading constituent of the mix. The binder coating may be a substantially insulating material, in which case the cadmium particles in various places are pressed into the substrate so that they penetrate through the binder coating to make direct contact with the cadmium oxide particles. The binder is most advantageously a curable butadiene polymer binder coating on the cadmium oxide particles preferably formed by heating an initial slurry of an emulsion of the binder and cadmium oxide particles to vaporize the liquid carrier and at least partially cure the binder material.

13 Claims, 10 Drawing Figures

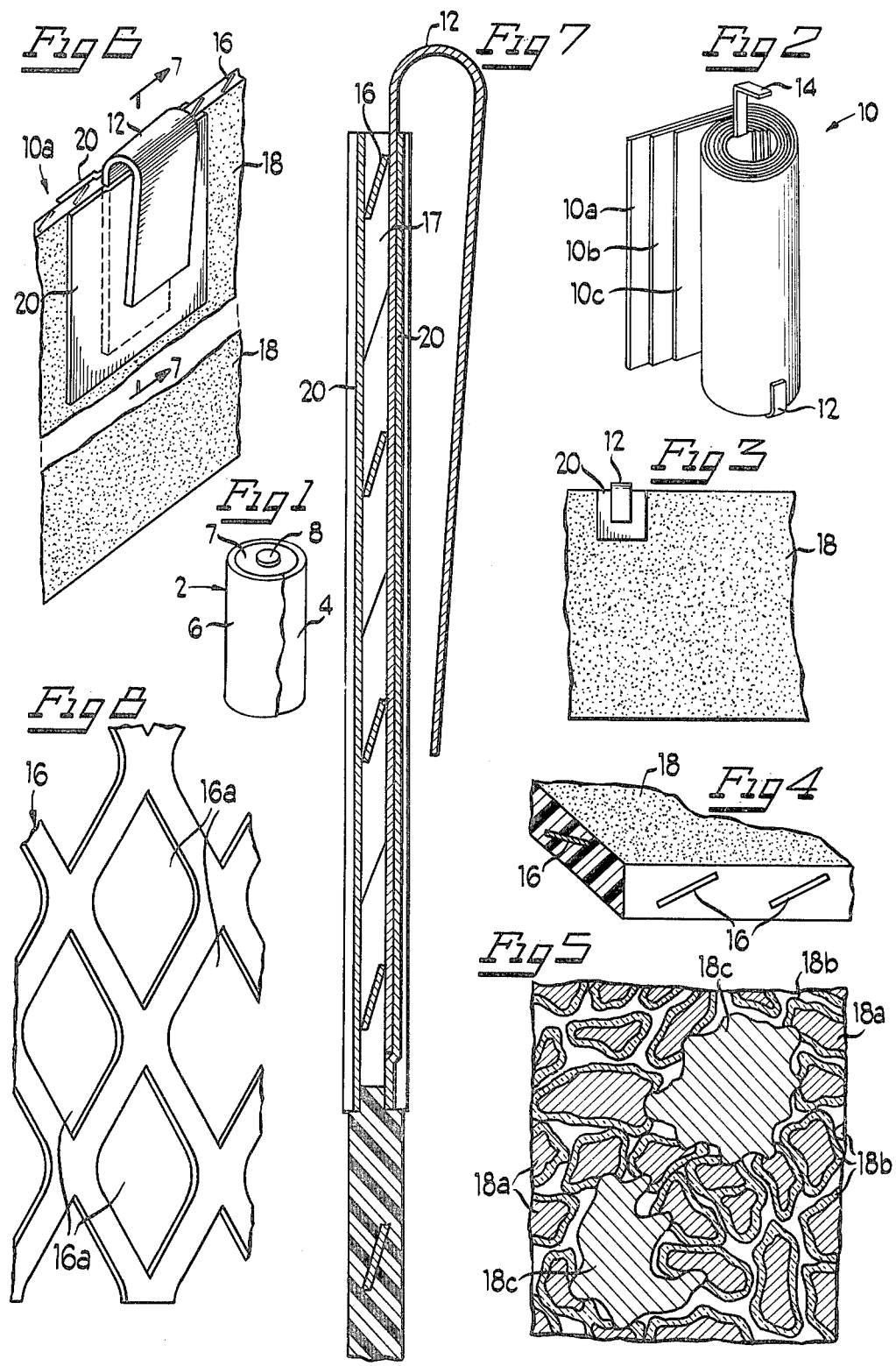

PRESSED CADMIUM ELECTRODE AND METHOD OF MAKING THE SAME

TECHNICAL FIELD OF INVENTION

This invention relates to a cadmium electrode design particularly suitable for use in sealed secondary cadmium batteries, particularly nickel-cadmium batteries. This electrode is particularly useful in such sealed batteries that are constructed with positive electrodes that are essentially in a fully discharged state at the time of cell closure, which is the most practical mode of assembly of such sealed battery systems, to insure that the desired state of charge of the cadmium negative electrode and the nickel electrode are easily controlled.

BACKGROUND OF INVENTION

It is known to manufacture cadmium electrodes using, as a starting material, only cadmium hydroxide (the discharged state of the cadmium electrode) which is obtained by a complex and costly procedure involving electroplating a cadmium nitrate complex on a porous screen followed by a charging process which converts this complex to cadmium. The cadmium forms a porous compressible body which is then pressed into the screen to the desired final thickness. Thge cadmium is then completely discharged to become cadmium hydroxide. In such a process, however, it is usually desirable to reduce by a partial charging operation some of the cadmium hydroxide to metallic cadmium before introduction of the electrode into a cell, to provide excess discharge capacity in the negative electrode to counter what is commonly called "fading". While the phenomenon of fading is not completely understood, apparently, during the life of the cell, some of the active material of the negative electrode no longer is easily reduced or oxidized. By providing an excess charge capacity in a negative electrode with respect to the positive electrode, such lost capacity can be compensated for.

To avoid the necessity of using any such costly, cumbersome, electroplating and charge-discharge operations, it has been proposed to mix cadmium oxide and cadmium powders together in the desired proportions and then add a binder-forming paste thereto which is applied to a screen. The coated screen is then placed in an oven to provide a dry coating of the active material mix. (One such process is disclosed in U.S. Pat. No. 3,888,655.) In one electrode made by this process, it was noted that the resulting product had a physical integrity which resulted in an electrode material which readily flaked-off the screen, making it difficult to cut the screen into a smaller desired size with smooth longitudinal edges. This screen was, therefore, cut to a desired width before the pasty mix was applied thereto.

As will appear, the present invention provides a cadmium electrode which does not require electroplating or charge or discharge operations in its manufacture, and the fabrication thereof utilizes pre-mixed cadmium and cadmium oxide particles held together by a binder applied in a unique way and in a unique sequence in the mixing process, to produce a superior pressed cadmium electrode having the desired proportion of cadmium and cadmium oxide. The binder-held mixture of the active material in the cadmium electrode of the invention has a physical integrity where the particles do not flake-off, and wherein the completed electrode can be cut down to any desired width or length during the mass production thereof, leaving smooth edges along the margins thereof.

SUMMARY OF THE INVENTION

In accordance with one of the features of the present invention, instead of adding a binder material to a mixture of the cadmium oxide and cadmium particles as in the prior art described, the cadmium oxide, which makes up most of the weight and bulk of the cadmium-cadmium oxide mix (e.g. about 75 percent thereof), before it is mixed with the cadmium particles is coated with a binder material. The binder material is most desirably a partially cured latex rubber or rubber-like material. While such material could be rendered electrically conductive by adding conductive materials thereto, it is preferably a non-conductive binder material. The cadmium particles are then added to the binder coated cadmium oxide particles in the desired proportion to provide the previously described pre-charge capacity, and this mixture is then applied and compressed under substantial pressures into the recesses or apertures of a rigid substrate, preferably an expanded metal screen, to form a dense material held together by the binder coatings of the cadmium oxide particles. Where the binder material is a partially cured latex rubber, the rubber is cured to a point where it has just lost its tackiness. The compression forces applied as the mix is pressed over and into the apertures of the screen generates heat which completely cures the rubber latex binder material.

Such a pressed mix provides an electrode where the cadmium and cadmium oxide binder held mix forms a dense, self-supporting body which tenaciously adheres to the defining walls and fills the apertures of the screen, and forms an electrode that can be sheared or otherwise cut to any desired size, leaving smooth edges along the cut lines. Also, it is believed that the act of compressing the particles together upon the screen forces portions of cadmium particles to penetrate the binder coatings of the cadmium oxide particles, so as to make good direct electrical contact therewith. The cadmium particles can thus perform most efficiently their desired electrical function in the electrode mixture involved, despite the use of an insulating binder material.

In accordance with a more specific aspect of the invention, the cadmium oxide particles are preferably much smaller in size than the cadmium particles to maximize the area of the binder material. Also, the particle mix which is pressed into the substrate is preferably made in a two step process. In the first step of the process, a slurry is preferably formed of an emulsion of the binder material and cadmium oxide particles. The binder material is preferably partially cured at the vaporization temperature of the liquid forming the slurry, which is preferably water. The liquid carrier is then heated to vaporize the same and partially cure the binder material. Upon vaporization of the carrier, the binder material will coat the cadmium oxide particles. The cadmium particles are then mixed into the binder coated cadmium oxide particles.

Other features and advantages of the invention will become apparent upon making reference to the specification to follow, the claims and the drawings.

DESCRIPTION OF DRAWINGS

FIG. 1 is a perspective view of a nickel cadmium battery which contained the cadmium electrode of the present invention;

FIG. 2 shows the spiral wound electrode assembly which is contained within the battery casing shown in FIG. 1;

FIG. 3 shows the cadmium electrode portion of the spiral wound electrode assembly of FIG. 2 before it is wound into a spiral form;

FIG. 4 is a greatly enlarged fragmentary view of a corner portion of the cadmium electrode of FIG. 3, showing the smooth edges thereof;

FIG. 5 is a microscopic view of the particles making up the active cathode material which is pressed into the expanded metal screen shown in other figures of the drawing;

FIG. 6 is a greatly enlarged fragmentary view of a portion of the electrode shown in FIG. 3 where the terminal strip has been applied thereto;

FIG. 7 is an enlarged sectional view through FIG. 6, taken along section line 7—7 thereof;

FIG. 8 shows a perspective view of the expanded metal screen upon and into which the active material of the electrode is pressed in the process of making the cadmium electrode shown in FIG. 3;

DESCRIPTION OF EXEMPLARY FORM OF THE INVENTION SHOWN IN THE DRAWINGS

Figure 10:
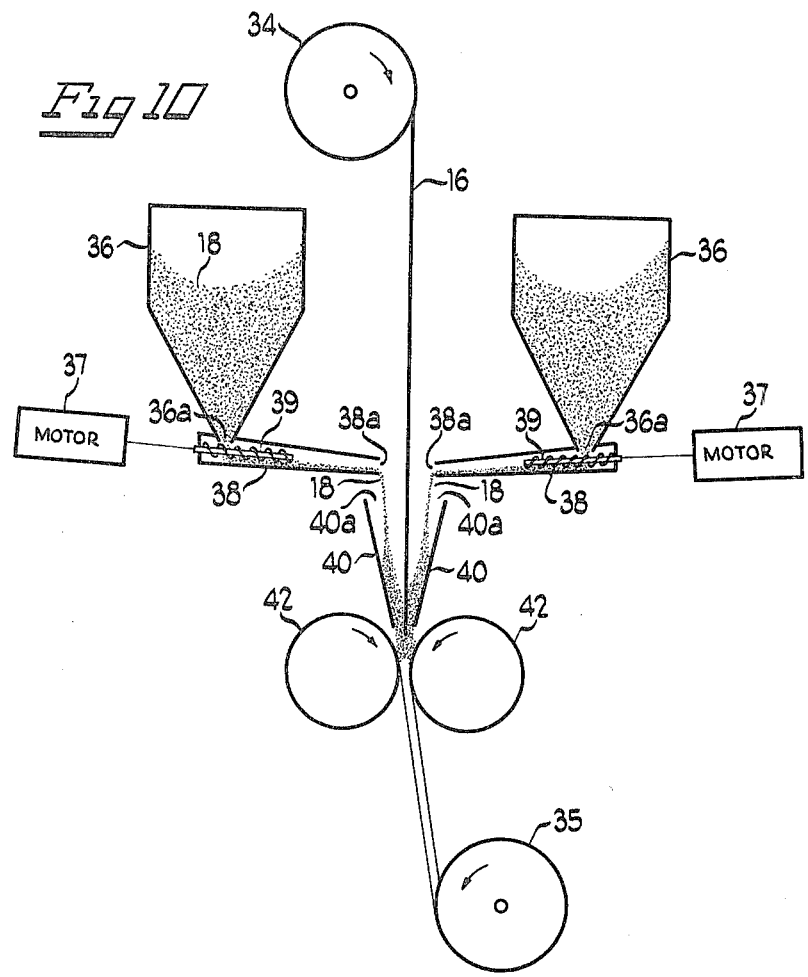
FIG. 10 is a diagrammatic view showing the preferred equipment for applying the binder-containing mix to the screen shown in FIG. 8 in a mass production operation.

As previously indicated, the pressed cadmium electrode of the present invention (10a in FIG. 2) is adapted for use in a nickel-cadmium battery where the cadmium electrode is rolled into a spiral form together with a separator sheet 10b and the positive electrode 10c, which could be a conventionally made nickel electrode. Such a rolled electrode assembly is shown in FIG. 2 and identified by reference numeral 10. This rolled electrode assembly is inserted into a cylindrical metal casing 4 shown in FIG. 1. The casing 4 is closed at the bottom by a metal wall (not shown) and is open at the top to receive an insulating closure 7, from the center of which projects the positive terminal 8 of the battery.

In FIG. 2, the positive nickel electrode identified by reference numeral 10c is shown having a terminal strip 14 projecting upwardly where it can make contact with a portion of the positive terminal 8 in a conventional way. The separator sheet 10b separates the cadmium electrode 10a from the positive electrode 10c. The cadmium electrode has a bent-back terminal strip 12 which makes contact with the bottom wall as well as the inner surface of the cylindrical casing 4.

The cadmium electrode 10a of the invention includes an expanded metal screen or other suitable recessed substrate 16 upon and into which is pressed under substantial pressure a unique mix 18 of cadmium oxide, cadmium particles and a binder which forms a dense, rubber-like coating and filler for the substrate 16. As is well known, when expanded metal screens are formed and stretched, there is formed relatively large diamond-shaped openings 16a defined by relatively narrow webs of conductive material, which may be a nickel plated iron alloy. The mixture of the cadmium oxide, cadmium and binder material fills the apertures 16a, and covers the metal webs of the substrate so that the electrode has the appearance of a dense, smooth-surfaced body having a rubber-like consistency, so that it can be readily rolled without any cracking or flaking of the material which covers and fills the recesses of the substrate. Also, the completed electrode can be readily cut to any desire size, leaving smooth surfaced edges, as illustrated in FIG. 4.

The mix 18 after it is compressed under high pressure within and over the surfaces of the expanded metal screen 16 has an appearance like that illustrated in FIG. 5. While micro-photographs taken of the mix do not clearly define the boundaries between the various cadmium particles and binder regions to be described, it is believed that FIG. 5 accurately depicts these boundary conditions.

In one exemplary mix of the invention, the cadmium oxide particles before being compressed were spheres having a diameter of about 1 micron, with a diameter variation of preferably plus or minus 0.2 micron. (However, in accordance with the broader aspects of the invention, the exact dimensions of the particles 18a can vary widely.) The cadmium oxide particles, which represent about 75% of the weight of the mixture, are coated with a binder material 18b which is preferably a partially cured rubber latex material. The precharge imparting cadmium particles 18c are dispersed throughout the binder coated cadmium oxide particles 18a. The cadmium particles are preferably much larger in size than the cadmium oxide particles, for example, such as about 10 microns in size, plus or minus 2 microns. Under the heavy pressures which these particles are subjected when pressed into and upon the substrate 16, it is believed that the margins of the cadmium particles penetrate the binder coatings of the cadmium oxide particles so that there is good electrical contact between the cadmium oxide and cadmium particles, even when the binder is an insulating binder material. The mix 18 would not have the desired conductivity if both the cadmium and cadmium oxide particles were coated with the binder material. Because the main bulk of the mix comprises the smaller binder coated cadmium particles, there in a large surface area of binder material and compacting of the mix forms a dense, self-supporting body of the compressed particles involved, which does not flake-off as in the case of previous mixes forming pressed cadmium electrodes.

While not limiting the variations of process conditions which can be made in accordance with the present invention, the following is an example of the process used to make a particular mix for a commercial prototype of the present invention, before the mix was pressed into the expanded metal screen substrate 16.

With the cadmium oxide and cadmium particle size as above described, a sample mix comprised 4,000 grams of spherical cadmium oxide particles mixed with 510 grams of a latex rubber binder emulsion manufactured by the Union Chemicals Division of the Union Oil Company of California under the specification Amsco Res. 4816. This is an emulsion of a copolymer of carboxylated, styrene butadiene with a ratio of styrene to butadiene of 55/45. The emulsion was 53% solids and 47% water, by weight. (By an emulsion is meant a generally even distributed suspension of particles of the copolymer in water.) Then, 1177 cc. of water was added to this mix, and the resultant slurry dried by heating the same in a crucible heated to the boiling temperature of the water while the mix was stirred. This partially cured the rubber-latex material and resulted in the cadmium oxide particles being coated with the partially cured rubber-latex material. Then there was added and stirred into the dried binder coated cadmium oxide particles 1504 grams of spherical cadmium particles.

By equipment similar to that shown in FIG. 10 to be described, the mix was pressed into and upon an expanded metal screen having a thickness of approximately 0.009 inches. (The expanded metal screen was a small mesh screen weighing 0.24 grams per square inch.) The mix was pressed and applied to the expanded metal screen to produce a mix thickness of about 0.017 inches. Thus, the mix projected beyond each margin of the screen about 0.004 inches.

Figure 9:
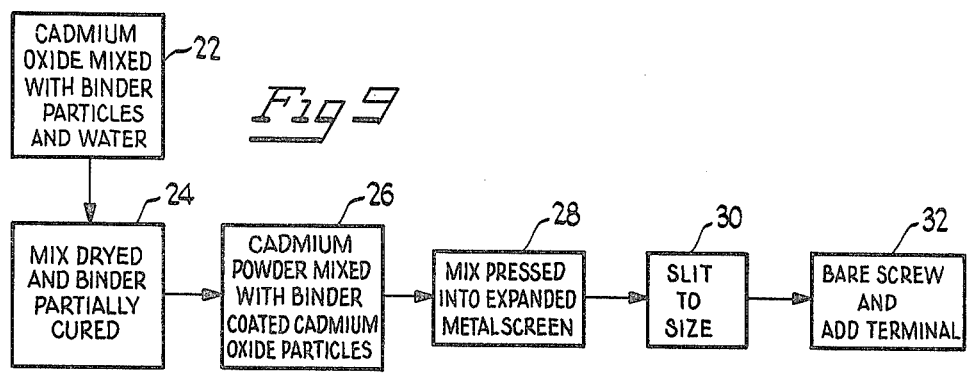
FIG. 9 is a block diagram illustrating the different steps in the process of making the cadmium electrode of the present invention.

FIG. 9 illustrates the sequence of the steps just described in the manufacture of the mix 18 and the pressing of the same into the expanded metal screen 16. Boxes 22, 24, and 26 therein indicate the various steps in forming the mix just described. Boxes 28, 30 and 32 therein indicate the remaining steps of completing an electrode 10a, namely of pressing the mix into the screen 16, slitting the resulting screen to a desired size, baring spaced portions of the screen and then adding and securing the terminal strips 12.

Refer now to FIG. 10 which illustrates one manner in which the processed mix of the binder coated cadmium oxide and the cadmium particles are pressed into the expanded metal screen 16 illustrated in FIG. 8. First of all, the metal screen 16 may initially be of a width and length much greater than that of the ultimate size of the electrode. Thus, as illustrated in FIG. 10, a long web of expanded metal screen material is wound up initially on a supply reel 34. The supply reel 34 is shown supported for rotation about a horizontal axis. The screen material is unwound from the supply reel 34 where it passes downwardly through an open-ended, vertically oriented tapered conduit 40. The screen then passes downwardly between two confronting pressure rollers 42—42 rotating in opposite directions about parallel horizontal axes and is wound upon a driven takeup reel 35 supported for rotation about a horizontal axis.

The mix of the binder coated cadmium oxide and cadmium particles is placed in a pair of hoppers 36—36 positioned on opposite sides of the downwardly moving web is the expanded metal screen material. The hoppers have tapered discharge openings 36a—36a at the bottoms thereof through which drop the mix involved into inlet openings of horizontally extending feed conduits 38—38 having suitable means for feeding the mix to dispensing openings 38a—38a of the conduits, where the mix falls into the top of tapered conduit 40 on opposite sides of the downwardly moving expanded metal screen material 16. As illustrated, the mix moves from the inlet openings of the conduits 38—38 to the dispensing opening 38a—38a thereof by rotating feed screws 39—39 driven by motors 37—37.

The particle mix delivered to the tapered conduit 40 drops from the discharge opening 40b thereof on opposite sides of the expanded metal screen material 16, where the particle mix is received in the downward tapering entryway defined between the confronting surfaces of the pressure rollers 42—42. In an exemplary form of the invention, the discharge opening 40b of the tapered conduit 40 has a width as viewed in FIG. 10 of approximately 0.040 inches and was spaced 0.400 inches from the horizontal plane containing the axes of the pressure rollers. The confronting surfaces of the rollers 42—42, which may have a diameter of 8 inches and driven at 3 rpm, may be spaced apart approximately 0.014. The speed of movement of the expanded metal screen may be 75 inches per minute. The rollers thus press the partial mix under substantial pressure into the expanded metal screen 16, where the binder forms a dense solid body. The pressures involved generated heat which completely cure the rubber latex binder material.

The web of cadmium-cadmium oxide carrying expanded metal screen material wound on the take-up reel 35 is obviously longer and wider than the size of the cadmium electrode 10a to be used in the battery 2. This web is thus first cut into strips of the desired width and bared at spaced points therealong so that the terminal strips 12 can be applied thereto. The boxes 30 and 32 in FIG. 9 illustrate these process steps. The baring or removal of the pressed particle mix from the metal screen is carried out in any suitable way well known in the art. For example, the particle mix can be removed by passing the electrode strip between a pair of rotating knurled rollers which wipe across opposite faces of the electrode strip. The terminal strips 12 are then inserted into the spaces or bared areas 17 (FIG. 9) along the edges of the electrode strips involved. Then, adhesive tape pieces 20—20 are applied to opposite faces of the electrode strip and the terminal strips bent back over one of the adhesive tape pieces, as shown in FIGS. 6 and 9. The electrode strip so processed can then be wound on a take-up reel for subsequent use or passed immediately to an electrode roll assembly station where the electrode strip is cut to form individual electrode elements of the desired length for assembly into a roll with the nickel and separator elements.

The baring and cutting of the cadmium electrode mix-carrying web into narrow strips and the baring of spaced areas thereof could be performed as the web leaves the pressure rollers 42—42 shown in FIG. 10. In such case, the individual strips can be wound upon individual take-up reels replacing single reel 35 illustrated in FIG. 10. Also, instead of inserting the terminal strips into bared areas of electrode strips, the screen baring operations may be dispensed with, and the electrode terminal strips 12 directly attached to the edges of the electrode strip as by punching the strip into the electrode strip and forming a rivet or eyelet from the terminal strip material to anchor the same to the electrode strip.

The present invention has thus provided an exceedingly reliable and flexible pressed cadmium electrode which can be readily rolled into a spiral form without cracking or breaking thereof, and further wherein an electrode-forming web can be readily cut down to a desired size leaving smooth edges.

It should be understood that numerous other modifications may be made in the most preferred forms of the invention described without deviating from the broader aspects of the invention.

I claim:

1. In a cadmium electrode for a rechargeable alkaline cell, said electrode comprising a rigid substrate having particle-receiving recesses therein into and upon which are applied a particulate mix of cadmium oxide particles and cadmium particles which constitute an active precharge anti-fading constituent of said mix, and held together by a binder, the improvement wherein said binder forms a coating on said cadmium oxide but not said cadmium particles, said cadmium particles being in conductive relation with the cadmium oxide particles and said substrate, and said particulate mix being compressed into and upon the recesses of said substrate.

2. The cadmium electrode of claim 1 wherein said binder is a substantially insulating material, and such cadmium particles are pressed into the binder coating on said cadmium oxide particles so that they penetrate the same to make direct contact with the cadmium oxide particles.

3. The cadmium electrode of claim 1 wherein the binder coated cadmium oxide particles were formed by heating an initial slurry of the binder and cadmium oxide particles in a vaporizable liquid carrier which was evaporated when the slurry was heated to evaporate the liquid carrier.

4. The cadmium electrode of claim 1 wherein the binder coated cadmium oxide particles was formed by heating an initial slurry of heat curable binder and cadmium oxide particles in a vaporizable liquid carrier to evaporate the liquid carrier and at least partially cure the binder and evaporate the liquid carrier.

5. The cadmium electrode of claim 1 wherein said substrate is an expanded metal screen.

6. The cadmium electrode of claim 1 wherein the binder held particle mix has a dense physical flake-free integrity, which can be cut into smooth edged smaller pieces by cutting shears or the like.

7. The cadmium electrode of claim 1 wherein said cadmium particles are many times the size of said cadmium oxide particles.

8. The cadmium electrode of claim 1 wherein said binder held particulate mix was compressed into and upon said substrate, to form squashed together binder held particles of cadmium and cadmium oxide particles.

9. The cadmium electrode of claim 8 wherein said cadmium oxide and cadmium particles have particle sizes of about 1 and 10 microns, respectively.

10. The electrode of claim 1 wherein said cadmium electrode is the negative electrode of a rechargeable alkaline cell.

11. The cadmium electrode of claim 1 wherein the cadmium oxide binder coated particles comprise substantially in excess of 50% of the total weight and bulk of the particulate mix.

12. The cadmium electrode of claim 11 wherein the cadmium particles are many times the size of the binder-coated cadmium oxide particles.

13. The cadmium electrode of claim 1 wherein the cadmium particles are many times the size of the binder-coated cadmium oxide particles.

* * * * *